United States Patent
Yang et al.

(10) Patent No.: US 9,785,330 B1
(45) Date of Patent: Oct. 10, 2017

(54) SYSTEMS FOR AND METHODS OF PROVIDING INERTIAL SCROLLING AND NAVIGATION USING A FINGERPRINT SENSOR CALCULATING SWIPING SPEED AND LENGTH

(75) Inventors: Wayne Yang, San Jose, CA (US); Rohini Krishnapura, Omaha, NE (US)

(73) Assignee: APPLE INC., Cupertino, CA (US)

( * ) Notice: Subject to any disclaimer, the term of this patent is extended or adjusted under 35 U.S.C. 154(b) by 1177 days.

(21) Appl. No.: 12/378,338

(22) Filed: Feb. 13, 2009

Related U.S. Application Data

(60) Provisional application No. 61/065,751, filed on Feb. 13, 2008.

(51) Int. Cl.
| | | |
|---|---|---|
| *G06F 3/0485* | (2013.01) | |
| *G06F 3/0488* | (2013.01) | |
| *G06K 9/00* | (2006.01) | |

(52) U.S. Cl.
CPC .......... *G06F 3/0485* (2013.01); *G06F 3/0488* (2013.01); *G06K 9/00026* (2013.01); *G06F 2203/0338* (2013.01); *G06F 2203/0339* (2013.01)

(58) Field of Classification Search
CPC ...... G06F 3/011; G06F 3/017; G06F 3/03547; G06F 3/041; G06F 3/0416; G06F 3/04845; G06F 3/0485; G06F 3/0487; G06F 3/0488; G06F 2203/0336; G06F 2203/0338; G06F 2203/0339; G06F 2203/04105; G06K 9/00006; G06K 9/00026; G06K 9/00067; G06K 9/00073; G06K 9/0008

USPC .......... 345/156–163, 167, 173, 179; 715/830–831, 863; 382/124, 126
See application file for complete search history.

(56) References Cited

U.S. PATENT DOCUMENTS

| | | | |
|---|---|---|---|
| 5,283,735 A | 2/1994 | Gross et al. | 364/413.02 |
| 5,327,161 A * | 7/1994 | Logan | G06F 3/03547 345/157 |
| 5,689,285 A | 11/1997 | Asher | 345/161 |
| 5,740,276 A | 4/1998 | Tomko et al. | 382/210 |
| 5,825,907 A | 10/1998 | Russo | 382/124 |
| 5,995,623 A | 11/1999 | Kawano et al. | 380/21 |
| 5,995,630 A | 11/1999 | Borza | 380/54 |
| 6,011,849 A | 1/2000 | Orrin | 380/42 |

(Continued)

OTHER PUBLICATIONS

Xudong Jiang et al., "Fingerprint Minutiae Matching Based on the Local and Global Structures," Sep. 2000, pp. 1038-1041, IEEE.

(Continued)

*Primary Examiner* — Keith Crawley
(74) *Attorney, Agent, or Firm* — Allen, Dyer, Doppelt, Gilchrist, P.A. Attorneys at Law

(57) ABSTRACT

An emulation system receives a swipe along a finger sensor to set a computer display in motion. After the swipe is completed, the display continues along its previous path. Depending on their direction, subsequent swipes can be used to accelerate or decelerate the motion. Gradually, the display decelerates. In one embodiment, this deceleration simulates an inertial decay, providing the user with a pleasing display that gradually rolls to a stop. The deceleration is modeled on a joystick return-to-home inertial decay, allowing the user greater control when navigating over the display. The finger sensor is used to emulate different electronic devices, such as a mouse, a scroll wheel, and a rotating wheel.

31 Claims, 12 Drawing Sheets

(56) References Cited

U.S. PATENT DOCUMENTS

| | | | |
|---|---|---|---|
| 6,035,398 A | 3/2000 | Bjorn | 713/186 |
| 6,141,753 A | 10/2000 | Zhao et al. | 713/176 |
| 6,219,793 B1 | 4/2001 | Li et al. | 713/202 |
| 6,219,794 B1 | 4/2001 | Soutar et al. | 713/202 |
| 6,317,508 B1 | 11/2001 | Kramer et al. | 382/124 |
| 6,330,345 B1 | 12/2001 | Russo et al. | 382/115 |
| 6,408,087 B1 | 6/2002 | Kramer | 382/124 |
| 6,518,560 B1 | 2/2003 | Yeh et al. | 250/214 |
| 6,535,622 B1 | 3/2003 | Russo et al. | 382/124 |
| 6,546,122 B1 | 4/2003 | Russo | 382/125 |
| 6,601,169 B2 | 7/2003 | Wallace, Jr. et al. | 713/151 |
| 6,681,034 B1 | 1/2004 | Russo | 382/125 |
| 6,804,378 B2 | 10/2004 | Rhoads | 382/100 |
| 7,054,470 B2 | 5/2006 | Bolle et al. | 382/124 |
| 7,113,179 B2 | 9/2006 | Baker et al. | 345/178 |
| 7,197,168 B2 | 3/2007 | Russo | 382/125 |
| 7,280,679 B2 | 10/2007 | Russo | 382/124 |
| 7,299,360 B2 | 11/2007 | Russo | 713/182 |
| 7,339,572 B2 | 3/2008 | Schena | 345/156 |
| 7,469,381 B2 * | 12/2008 | Ording | 715/702 |
| 7,474,772 B2 | 1/2009 | Russo et al. | 382/124 |
| 7,978,177 B2 * | 7/2011 | Nash et al. | 345/163 |
| 2002/0188854 A1 | 12/2002 | Heaven et al. | 713/186 |
| 2003/0028811 A1 | 2/2003 | Walker et al. | 713/202 |
| 2003/0115490 A1 | 6/2003 | Russo et al. | 713/202 |
| 2003/0123714 A1 | 7/2003 | O'Gorman et al. | 382/124 |
| 2004/0128521 A1 | 7/2004 | Russo | 713/186 |
| 2004/0208348 A1 | 10/2004 | Baharav et al. | 382/124 |
| 2005/0012714 A1 * | 1/2005 | Russo et al. | 345/157 |
| 2005/0041885 A1 | 2/2005 | Russo | 382/289 |
| 2005/0169503 A1 | 8/2005 | Howell et al. | 382/115 |
| 2005/0179657 A1 | 8/2005 | Russo et al. | 345/163 |
| 2005/0259852 A1 | 11/2005 | Russo | 382/124 |
| 2006/0019752 A1 * | 1/2006 | Ohta | A63F 13/06 463/43 |
| 2006/0038796 A1 * | 2/2006 | Hinckley et al. | 345/173 |
| 2006/0078174 A1 | 4/2006 | Russo | 382/121 |
| 2006/0103633 A1 | 5/2006 | Gioeli | 345/173 |
| 2006/0280346 A1 | 12/2006 | Machida | 382/124 |
| 2007/0014443 A1 | 1/2007 | Russo | 382/124 |
| 2007/0016779 A1 | 1/2007 | Lyle | 713/169 |
| 2007/0038867 A1 | 2/2007 | Verbauwhede et al. | 713/186 |
| 2007/0061126 A1 | 3/2007 | Russo et al. | 703/24 |
| 2007/0067642 A1 | 3/2007 | Singhal | 713/186 |
| 2007/0146349 A1 | 6/2007 | Errico et al. | 345/174 |
| 2007/0274575 A1 | 11/2007 | Russo | 382/124 |
| 2008/0013808 A1 | 1/2008 | Russo et al. | 382/125 |
| 2008/0094367 A1 * | 4/2008 | Van De Ven et al. | 345/173 |
| 2008/0205714 A1 * | 8/2008 | Benkley | G06F 3/03547 382/126 |

OTHER PUBLICATIONS

Kyung Deok Yu et al., "A Fingerprint Matching Algorithm based on Radial Structure and a Structure-Rewarding Scoring Strategy," Jun. 2005, pp. 656-664, AVBPA, LNCS, Audio- and Video-Based Biometric Person Authentication, Springer-Verlag Berlin-Heidelberg.

* cited by examiner

SYSTEMS FOR AND METHODS OF PROVIDING INERTIAL SCROLLING AND NAVIGATION USING A FINGERPRINT SENSOR CALCULATING SWIPING SPEED AND LENGTH

RELATED APPLICATION

This application claims priority under 35 U.S.C. §119(e) of the U.S. provisional patent application Ser. No. 61/065,751, filed Feb. 13, 2008, and titled "System for Providing Inertial Scrolling/Navigation Using a Fingerprint Sensor," which is hereby incorporated by reference.

FIELD OF THE INVENTION

This invention relates to input devices. More specifically, this invention relates to systems for and methods of scrolling and navigating using fingerprint sensors.

BACKGROUND OF THE INVENTION

Fingerprint sensors find many uses, including verifying a user's identity and emulating different input devices, such as computer mice, pressure-sensitive buttons, and scroll wheels. Many sensors read finger swipes to scroll through pages, menu items, slides of images, and other displayed information. Generally, when the finger swipe stops, the scrolling stops, especially if the finger is removed from the surface of the fingerprint sensor. Using conventional scrolling techniques, a user must perform multiple swipes, with several starts and stops, to scroll through a large area. Navigating in this way is both inefficient and time consuming.

SUMMARY OF THE INVENTION

In a first aspect of the invention, a method includes generating motion of a computer display in response to swiping an object along a finger sensor. After the swiping is completed, the motion gradually changes. In one embodiment, the motion decelerates, such as with an inertial decay. A dampening factor of the inertial decay is related to a speed of the swiping or a duration of the swiping. Preferably, the inertial decay is calculated using a model of a joystick return-to-home motion.

In one embodiment, the method also includes stopping the motion in response to tapping the finger sensor after the swiping is completed. The method also includes performing an action on a computer system in response to changing a pressure on the finger sensor (e.g., by tapping the sensor) after the swiping is completed. If the computer display shows an image, the action includes either zooming in on the image or zooming out from the image.

In one embodiment, the motion corresponds to scrolling through a list of items, rotating an image, or moving over an image. The computer display shows a list of items, a region of an image, a grid menu, slides of images, a game image, or an element of a computer simulation.

Changing the motion includes changing a speed of the computer display in response to one or more subsequent swipes after the swiping is completed. In one embodiment, the speed is increased if the one or more subsequent swipes are in a same direction as the swiping. The speed is decreased if the one or more subsequent swipes are in a different direction as the swiping.

In one embodiment, the method also includes accelerating the motion by holding the object stationary on the finger sensor before the swiping is completed.

Preferably, the finger sensor is a finger swipe sensor. Alternatively, the finger sensor is a finger placement sensor.

In a second aspect of the invention, a navigation system includes a finger sensor and a translator module. The translator module is programmed for gradually changing a motion of a computer display in response to completing swiping an object across the finger sensor. In one embodiment, the motion is changed by decelerating it, such as uniformly. Preferably, the uniform deceleration has an inertial decay, such as one modeled on a joystick return-to-home motion.

In one embodiment, the motion is changed by accelerating it in response to receiving one or more swipes across the finger sensor in a same direction as the swiping. In another embodiment, the motion is changed by decelerating it in response to receiving one or more swipes across the finger sensor in an opposite direction as the swiping.

In one embodiment, the translator module is also programmed to single-step scroll through the computer display and to control the computer display in response to determining a change in pressure on a surface of the finger sensor.

In one embodiment, the motion is changed by both accelerating it and decelerating it, at different times.

Preferably, the translator module is also programmed to suddenly stop the motion in response to a performing a predetermined stop motion across the finger sensor. The predetermined stop motion is a tap or a press-and-hold motion, to name only a few possible motions.

In one embodiment, the translator module includes a computer-readable medium containing computer instructions that, when executed by a processor, result in gradually changing the motion, suddenly stopping the motion, or both.

In a third aspect of the invention, a navigation system includes a finger sensor, a movement correlator coupled to the finger sensor, an acceleration calculator coupled to the movement correlator, and multiple electronic input device emulators, each coupled to the acceleration calculator and to a computer display device. The acceleration calculator is programmed to gradually accelerate, decelerate, or both, a motion of a display on a computer display device in response to completing a swipe across the finger sensor. In one embodiment, the acceleration calculator is programmed to determine an inertial decay of the deceleration. The multiple input device emulators include any two or more of a mouse emulator, a scroll wheel emulator, a push-button emulator, and a wheel emulator.

DETAILED DESCRIPTION OF THE PREFERRED EMBODIMENT

Embodiments of the present invention use a fingerprint sensor to control the movement of elements on a computer or other display. The elements, such as items in a menu or a window overlying a map, are set in motion and then gradually come to a stop. The display is visually pleasing and, more importantly, gives the user greater control when navigating through the display.

In one example, the elements are a list of items in a menu. Rather than single-stepping through the items, using conventional scrolling means, a single finger swipe sets the menu in motion before it gradually decelerates and comes to a stop. This fluid scrolling through a menu is generally more intuitive and preferred than scrolling with several starts and stops as when using conventional scrolling implementations.

Preferably, the gradual deceleration simulates an inertial decay, much as the speed of a pinwheel decreases after it has been launched: Once the wheel is spinning, external interaction is no longer required to keep it going. Eventually, the wheel slows down and comes to a stop due to friction.

Many displayed applications benefit from this simulation of inertial decay. For example, a movable window enclosing a portion of an image map is navigated to overlie different regions of the map. The window can be set in motion along any direction (e.g., in a north western direction), toward a region or area of interest, before gradually decelerating.

Preferably, the inertial deceleration is modeled after a joystick with a dampened return to its home or origin. In this implementation, finger movement, as computed in the traditional manner, translates to movement of the joystick head, which is then translated to a motion, such as a scrolling motion. The position of the joystick head, as well as the current acceleration state of the motion model, dictates the speed with which the scrolling or other motion occurs. When a finger is lifted from the fingerprint sensor, the joystick head will return to its origin or home position.

In accordance with other embodiments of the present invention, an "additive" attribute of scrolling and other motion is implemented. For example, consecutive finger swipes across a surface of a finger sensor in a same direction will, with each swipe, increase the speed of a computer display. Swiping in an opposite direction will slow the motion or even bring it to a stop. Swiping in an opposite direction thus functions as a drag on the motion.

The discussion that follows first explains one implementation of the invention, used to emulate a scroll wheel. The general terms discussed in that implementation are then used to explain how the invention can be extended, used to apply this gradual deceleration to other input devices. Some of this discussion is also applicable to the use of additive motion, such as scrolling.

Figure 1A:
FIGS. 1A-E illustrate inertial scrolling through menu items by swiping a finger across a finger sensor in accordance with one embodiment of the present invention.

FIGS. 1A-E show a finger swipe sensor 105 and a display device 125 at a sequence of times $T_1$-$T_5$, respectively. To better describe embodiments of the present invention, the sequence is at regular intervals, that is, the differences $T_2$-$T_1$, $T_3$-$T_2$, $T_4$-$T_3$, and $T_5$-$T_4$ are the same. The display device 125 shows a menu 120 of names; the swipe sensor 105 is used to scroll through the menu 120. In this embodiment, the swipe sensor 105 is used to emulate a scroll wheel. As shown in FIG. 1A, at time $T_1$ a finger 101 is swiped along a surface of the swipe sensor 105. FIG. 1A shows a horizontal line above the finger 101, having an arrow indicating the direction of the swipe, and a vertical line next to the menu 120, having an arrow indicating the direction of the scrolling. The vertical line has a thickness corresponding to a speed with which the menu 120 scrolls: A thicker vertical line indicates that the menu 120 is scrolling faster than when the menu 120 is adjacent to a thinner vertical line.

Figure 1B:
Figure 1C:
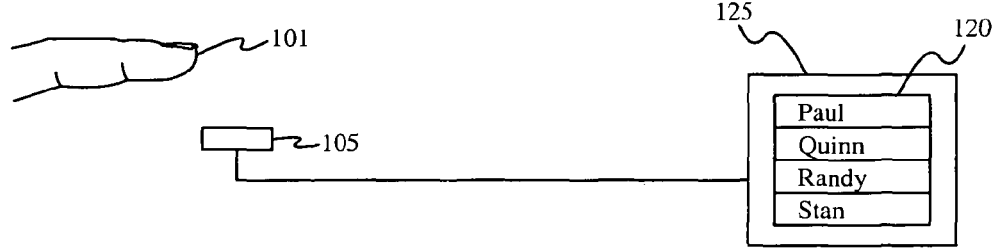
Figure 1D:
Figure 1E:

FIG. 1B shows the finger 101 at time $T_2$. As shown in FIG. 1B, the thickness of the vertical line in FIG. 1B indicates that the menu 120 scrolls faster than it did at time $T_1$. At time $T_3$, shown in FIG. 1C, the finger 101 has left the finger sensor 105, but the menu 120 continues to scroll, but slower than at time $T_2$. At time $T_4$, the menu 120 continues to scroll, but slower than it did at time $T_3$. At time $T_5$, the menu 120 has stopped scrolling. In this example, after the swiping is completed (at time $T_2$), the menu 120 gradually slows to a stop, preferably simulating a spring's critically damped or over-damped motion or a motion corresponding to a joystick's return-to-home motion. When simulating this joystick motion, modeled in embodiments of the invention, the rate at which the joystick head returns to the home position is influenced by a dampening factor, such as the weight of the joystick.

The dampening factor acts as an inertial decay factor. By using different decay factors, different inertial scrolling behavior can be achieved. The inertial scrolling can be customized by mapping several factors (including, but not limited to, the dampening factor and the acceleration factor) to the axial displacement of the joystick.

Figure 2:
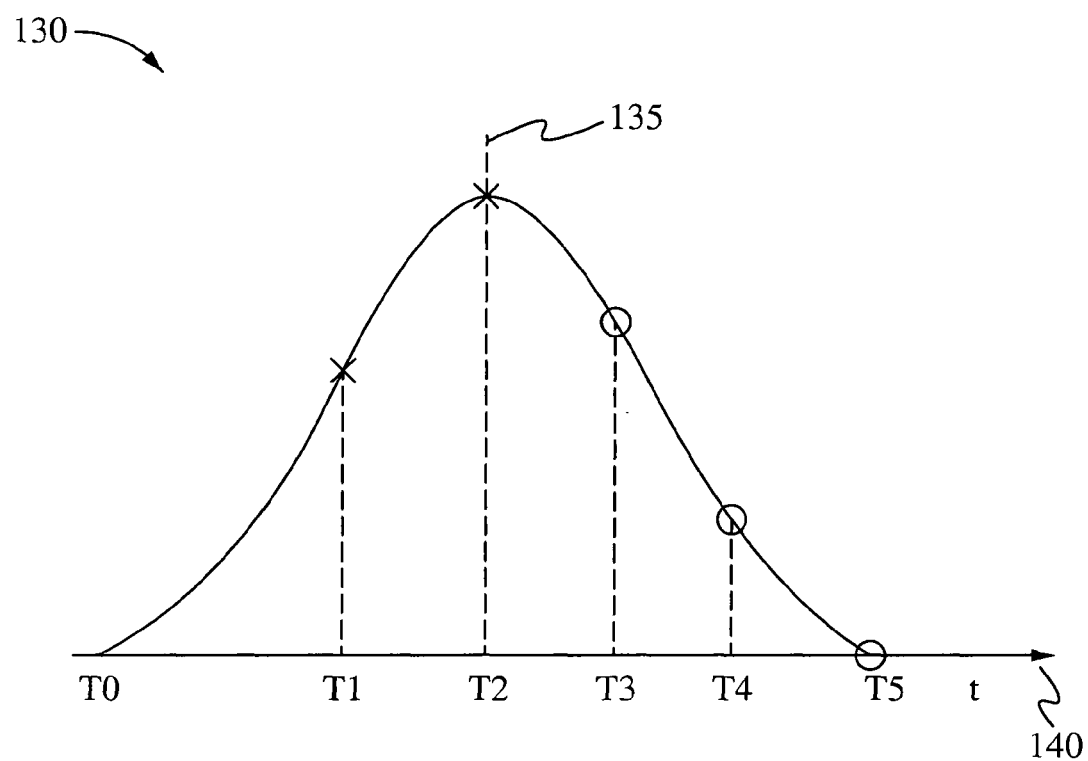
FIG. 2 is a graph of finger motion along a finger sensor versus time in accordance with one embodiment of the present invention.

FIG. 2 is a graph 130 plotting the speed at which the menu 120 of FIGS. 1A-E scrolls. Throughout this Specification, identical labels refer to identical elements. In the graph 130, speed is plotted on the vertical axis 135, and time is plotted on the horizontal axis 140. For each time $T_0$-$T_5$, the graph 130 shows an "x" to indicate when the finger 101 is on the sensor 105 and a "o" to indicate when the finger 101 is off the sensor 105.

As shown in FIG. 2, the finger 101 first touches the sensor 105 at time $T_0$. The finger 101 then moves along the sensor 105 at a speed that increases from time $T_1$ to time $T_2$, when the finger 101 is removed from the sensor 105. From time $T_2$ to time $T_5$, the speed with which the menu 120 scrolls gradually decreases until it stops at time $T_5$.

Figure 3A:
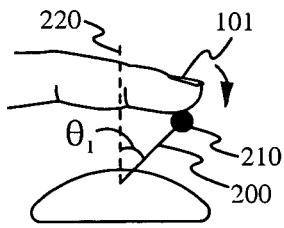
FIGS. 3A-E illustrate inertial return-to-home motion of a joystick, used to control scrolling in accordance with the present invention.
Figure 3B:
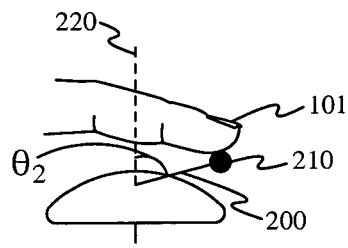
Figure 3C:
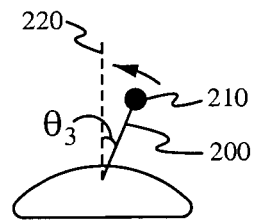
Figure 3D:
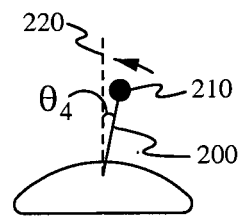
Figure 3E:
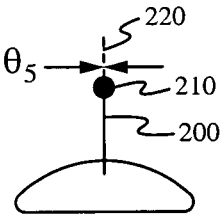

Preferably, a joystick return-to-home motion is modeled to generate signals used to gradually decelerate the display movement. As one example, FIGS. 3A-E show a joystick 200, whose return-to-home motion is emulated. FIGS. 3A-E show the joystick 200 at the sequential times $T_1$-$T_5$, respectively. Referring to FIGS. 3A-E, the speed with which the joystick 200 moves a displayed object is directly proportional to an angle θ that the joystick 200 makes with an axis 220 perpendicular with the joystick base, much like a throttle. FIG. 3A shows the joystick 200 making an angle θ, with the axis 220, corresponding to the movement of the menu display 120 shown in FIG. 1A. Similarly, FIGS. 3B-C show the joystick making angles $θ_2$-$θ_5$, respectively, corresponding to the movement of the menu display 120 shown in FIGS. 1B-E, respectively. In this example, $θ_5$=0, indicating that the menu display 120 is not moving.

Those skilled in the art will recognize that the return-to-home motion of the joystick 200 after it is released (FIGS. 3B-E) is dependent on several parameters, such as the angle $θ_2$ at which the joystick 200 is released and the mass of a head 210 of the joystick 200, to name only a few parameters.

In one embodiment, the angle $θ_i$ is given by Equation 1:

$$θ_i = θ_1 e^{-(Ω+K)t}$$ [Equation 1]

where Ω is a damping factor, K is a constant, and t is time. The damping factor Ω is related to the mass of the head 210. In one embodiment, the damping factor Ω is directly proportional to the mass of the head 210.

In one embodiment, the angle $θ_i$ is directly mapped to a distance a menu item is from a point of reference. In one embodiment, the distance is the distance of the head 211 from the axis 220. For example, x=length of the joystick (L)*sin($θ_i$). The linear speed of the distance x (dx/dt) is given by Equation 2:

$$dx/dt = L * dθ/dt * \cos(θ)$$ [Equation 2]

Equations 1 and 2 together are used to map a joystick (angular) damped deceleration to a scrolling (linear) damped deceleration. Thus, a uniform return-to-home deceleration motion is mapped to a scrolling deceleration motion.

It will be appreciated that, together, Equations 1 and 2 are only one example of a function used to calculate the angle $θ_i$ at time t (e.g., each of the times $T_1$-$T_5$) and thus a rate of uniform deceleration.

Figure 4:
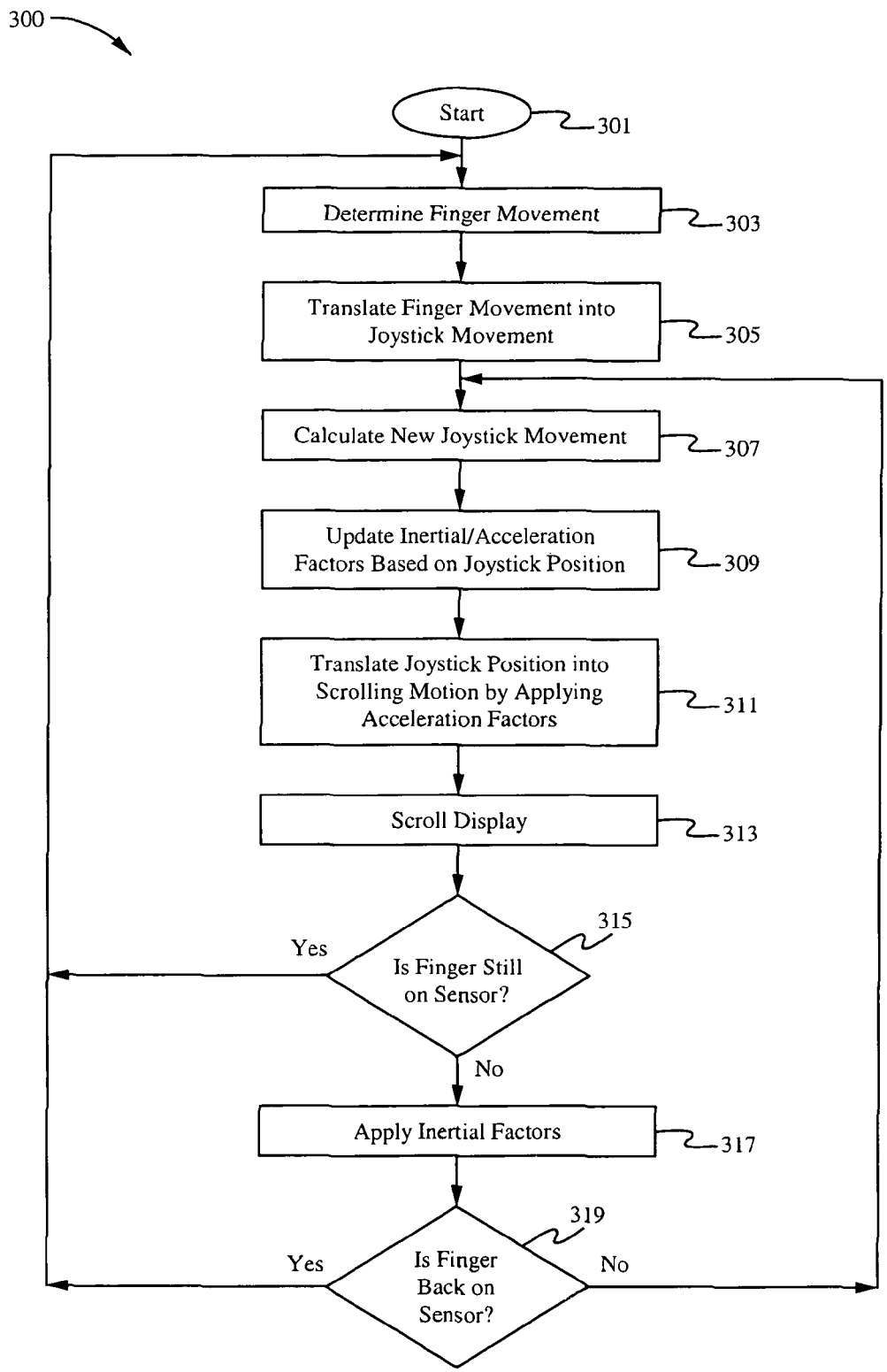
FIG. 4 is a flow chart showing the steps for scrolling through a screen display in accordance with one embodiment of the present invention.

FIG. 4 is a flow chart showing the steps of a process 300 for determining inertial deceleration corresponding to a joystick return-to-home motion and using that deceleration to control the scrolling of a menu in accordance with the present invention. Referring to FIGS. 1A-E, 3A-E, and 4, in the start step 301, parameters, such as Ω (Equation 1), are initialized and others are computed. Next, in the step 303, the movement of the finger 101 along a surface of the finger swipe sensor 105 is computed. Preferably, this movement is determined by correlating a pattern on a surface of the finger 101 captured at sequential times (e.g., $T_1$ and $T_2$) to determine the speed and direction of the finger swipe. The patterns are formed by the location of bifurcations, pores, ridge endings, swirls, whorls, and other fingerprint minutiae. Correlating fingerprint images is taught in U.S. Pat. No. 7,197,168, filed Jul. 12, 2002, and titled "Method and System for Biometric Image Assembly from Multiple Partial Biometric Frame Scans," which is incorporated by reference in its entirety. It will be appreciated that other objects with patterned images, such as patterned styluses, can also be swiped across a finger sensor to scroll through menus in accordance with the present invention.

Next, in the step 305, the finger movement is translated into joystick movement, and in the step 307, the new joystick movement is calculated. Next, in the step 309, inertial/acceleration factors based on the joystick position are updated. In the step 311, the joystick position is translated into a scrolling motion by applying the acceleration factors, and in the step 313, the scrolling motion is used to scroll the menu 120.

In the step 315, the process determines whether the finger 101 is still on the sensor 105. If the finger 101 is still on the sensor 105, the process loops back to the step 303; otherwise, the process continues to the step 317, in which it applies the inertial factors to determine the deceleration. These inertial factors can be based on the speed of the swipe when it is completed, the duration of the swipe, the length of the swipe, or some combination of these. For example, if the speed of the swipe is fast or the duration of the swipe is long, the inertial factors result in a slower deceleration. This result corresponds to a large momentum being imparted to a body.

From the step 317, the process continues to the step 319, in which it determines whether the finger 101 is back on the sensor 105. If the finger 101 is back on the sensor 101, the process loops back to the step 303; otherwise, the process loops back to the step 307.

Figure 5:
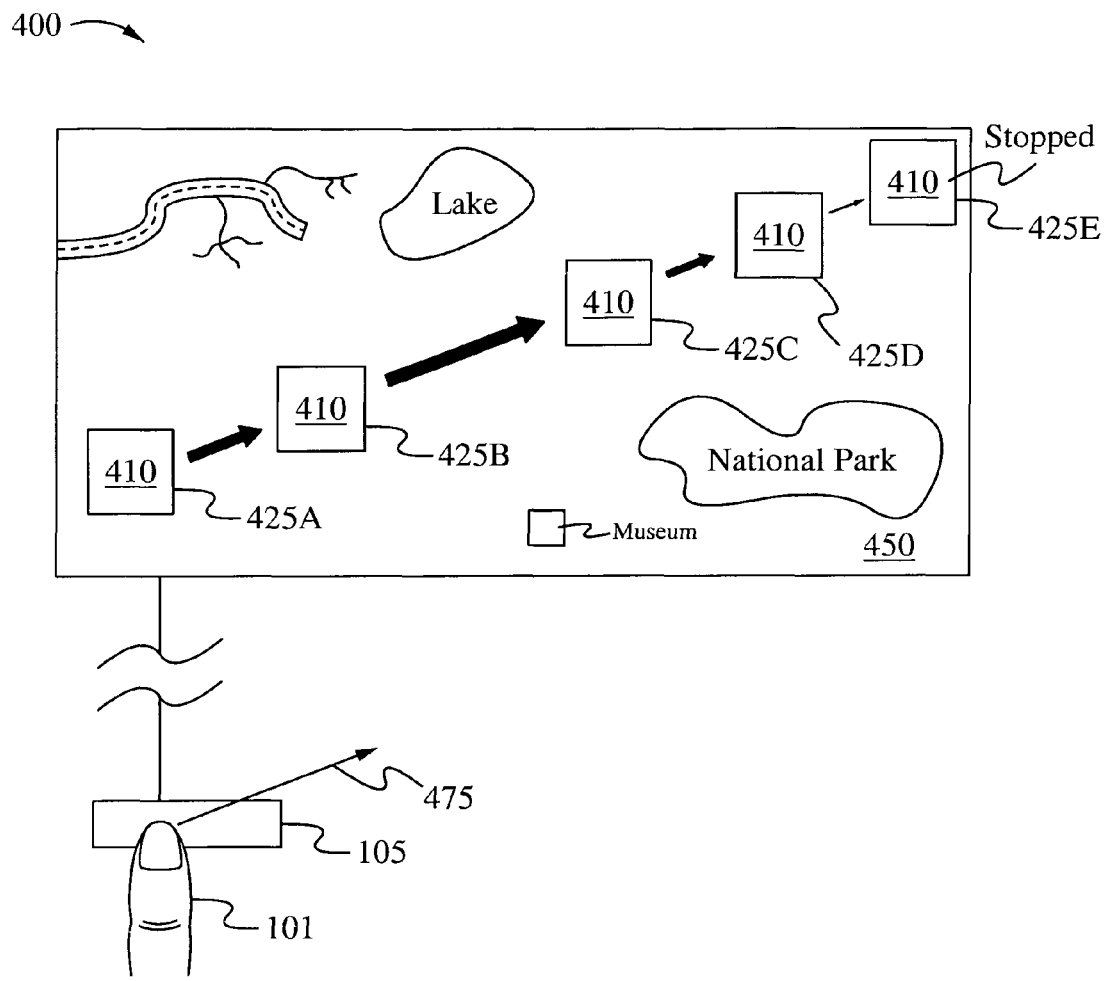
FIG. 5 shows a window translated over an image of a map in accordance with one embodiment of the present invention.
Figure 6:
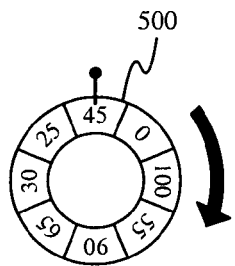
FIGS. 6A-E illustrate emulation of a wheel on a gaming device using inertial deceleration in accordance with one embodiment of the present invention.
Figure 6:
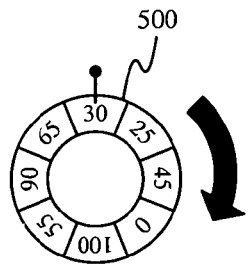
Figure 6:
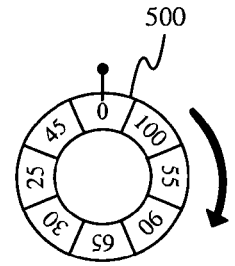
Figure 6:
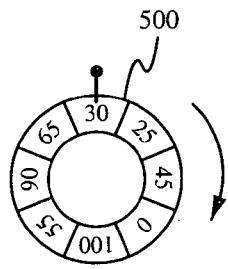
Figure 6:
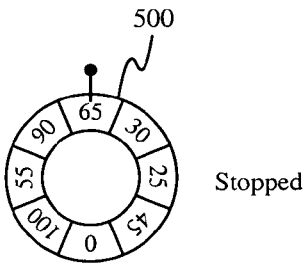

As explained above, embodiments of the invention are able to uniformly decelerate motion generated by many electronic input devices, controlling different displays. FIG. 5 illustrates the finger sensor 105 used to control a display 450 on the display device 125. The display 450 is an image map overlayed by a movable window 410, which encloses portions of the image map 450. Swiping the finger 101 over the finger sensor 105 in the direction indicated by the arrow 475 causes the window 410 to move or translate in a corresponding direction over the image map 450. In this embodiment, the finger sensor 105 is emulating a mouse or a track ball. The window 410 moves from the location 425A at time $T_1$, to location 425B at time $T_2$, to location 425C at time $T_3$, to location 425D at time $T_4$, and finally to location 425E at time $T_5$, where it stops. Again, the thicknesses of the arrows joining adjacent locations (e.g., the arrow connecting the window 410 at locations 425A and 425B) indicate the speed with which the window 410 moves. The speed with which the window 410 moves decelerates from time $T_2$ to $T_5$, preferably in an inertial manner.

It will be appreciated that deceleration can be determined in other ways. For example, deceleration can be determined from a look-up table. The look-up table can map the current speed and map it into a display speed for each sequential time. In one example, a table stores scaling factors used for mapping current speed to subsequent speeds. As one example, the table stores 10 scaling factors for 10 corresponding time cycles. Thus, if the current display speed is 10 frames-per-second (fps), after one second, the speed is multiplied by the first entry in the table, the scaling factor 0.9, to determine the speed after one second: 10 fps*0.9=9 fps. If the second entry in the table is 0.7, the speed during the next second of scrolling is the current speed times the next scaling factor (9 fps*0.7), or 6.3 fps. This table lookup continues until the last scaling factor (0.0) stops the scrolling. Using table look-ups in this way, linear, non-linear, step-wise (e.g., the speed is decreased, maintained over a time segment and decreased again, with the sequence continuing until scrolling stops), and other types of decay can be determined to control scrolling.

It will be appreciated that deceleration in accordance with the present invention is able to be uniform or non-uniform. Different types of deceleration can be used to fit the application at hand. Indeed, uniform deceleration can be used over one time interval and non-uniform deceleration over another time interval.

FIGS. 6A-E show another example, in which modeling inertial decay is used to decelerate a different display, a computer simulated gaming wheel 500, such as a roulette wheel. FIGS. 6A-E show the gaming wheel 500 at the times $T_1$-$T_5$, respectively, controlled using a finger sensor (not shown). When a user traces a circular or semi-circular path along the finger sensor, the gaming wheel 500 is turned in the same direction. When the finger is removed from the finger sensor (at the time shown in FIG. 6B), the gaming wheel 500 continues to rotate, but at a rate that has an inertial decay in accordance with the present invention. As in FIGS. 1A-E, the widths and arrows of the curved lines next to the gaming wheel 500 indicate the speed and direction, respectively, that the gaming wheel 500 is rotating.

Figure 7:
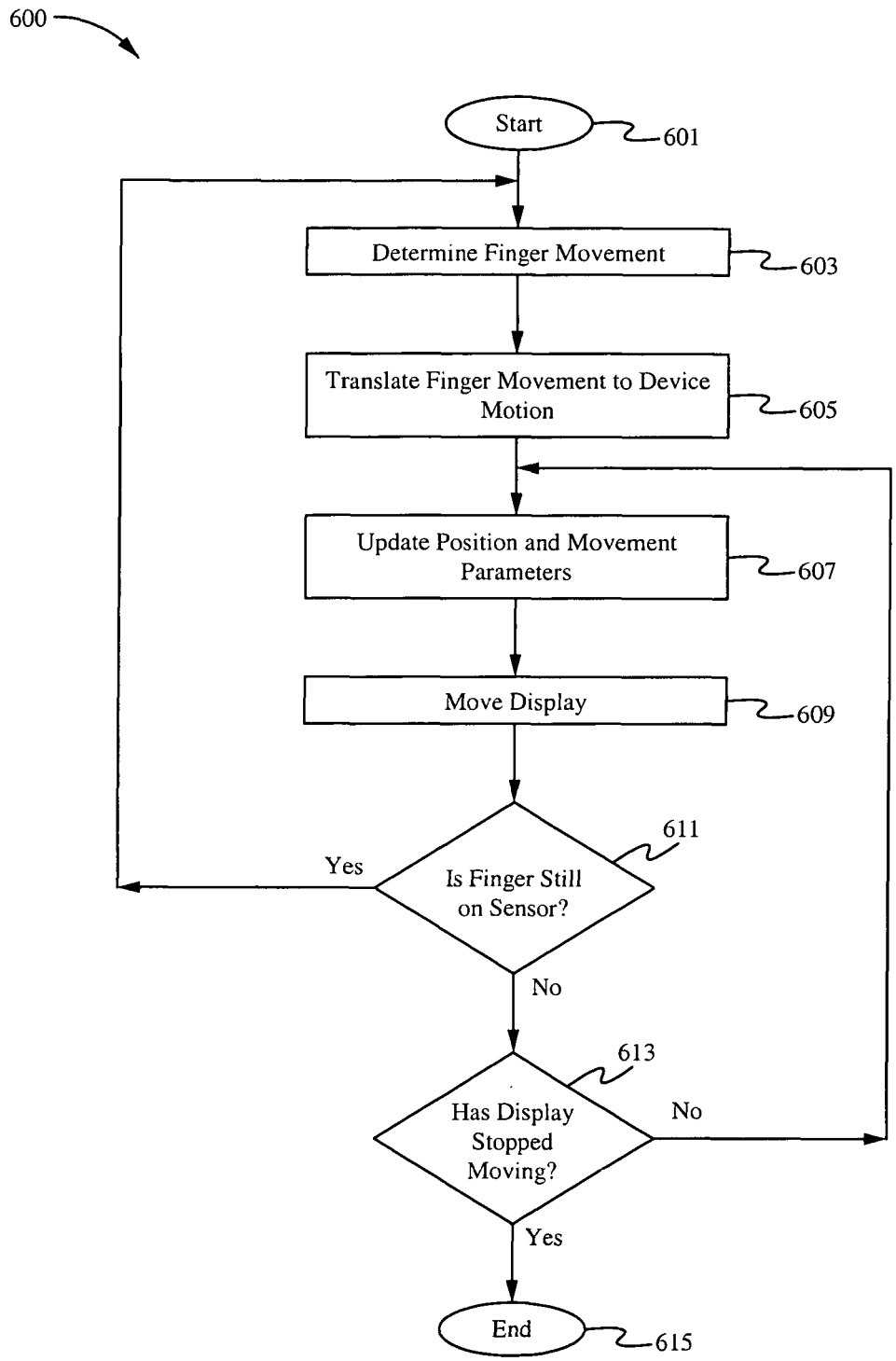
FIG. 7 is a flow chart of the steps for using inertial decay to emulate different types of input devices in accordance with the present invention.

FIG. 7 shows the steps of a process 600 for generally moving a computer display by using a finger sensor to emulate any number of electronic input devices in accordance with the present invention. The electronic input devices include, but are not limited to, a scroll wheel, a mouse, a wheel, a track ball, a push button, and a joy stick. First, in the start step 601, parameters such as a dampening factor are initialized. Next, in the step 603, a finger movement along the finger sensor is determined. and in the step 605, the movement is translated to a motion of the emulated device. This motion can be the movement of a joystick, a scrolling motion, a translation motion (such as of a window over a map), and a button press, to name only a few.

Next, in the step 607, the position and movement parameters of the emulated device are updated. Examples of movement parameters include acceleration and direction. These parameters are used to determine the direction that is to be taken (e.g., continued) when the finger no longer touches the finger sensor. The acceleration can include gradual (uniform or non-uniform) deceleration. In the step 609, the display (e.g., a list of menu items) is moved in a manner corresponding to the emulated electronic input device.

In the step 611, the process determines whether the finger is still on the finger sensor. If the finger is still on the finger sensor, the process loops back to the step 603. Otherwise, the process continues to the step 613, in which it determines whether the display has stopped moving. If the display has not stopped moving, the process loops back to the step 603. Otherwise, the process continues to the step 615, in which it ends.

In accordance with the present invention, a sudden-stop feature instantly stops the inertial movement (e.g., scrolling) with a fresh touch of the finger sensor 105. In this way, a user can quickly change a scrolling direction without having to wait for the scrolling to stop. This not only allows for greater ease of use but also allows quick turnaround of fresh movements in other directions. With this feature, there is no need to generate extra movement to overcome the current inertia before shifting the direction of motion.

Figure 8:
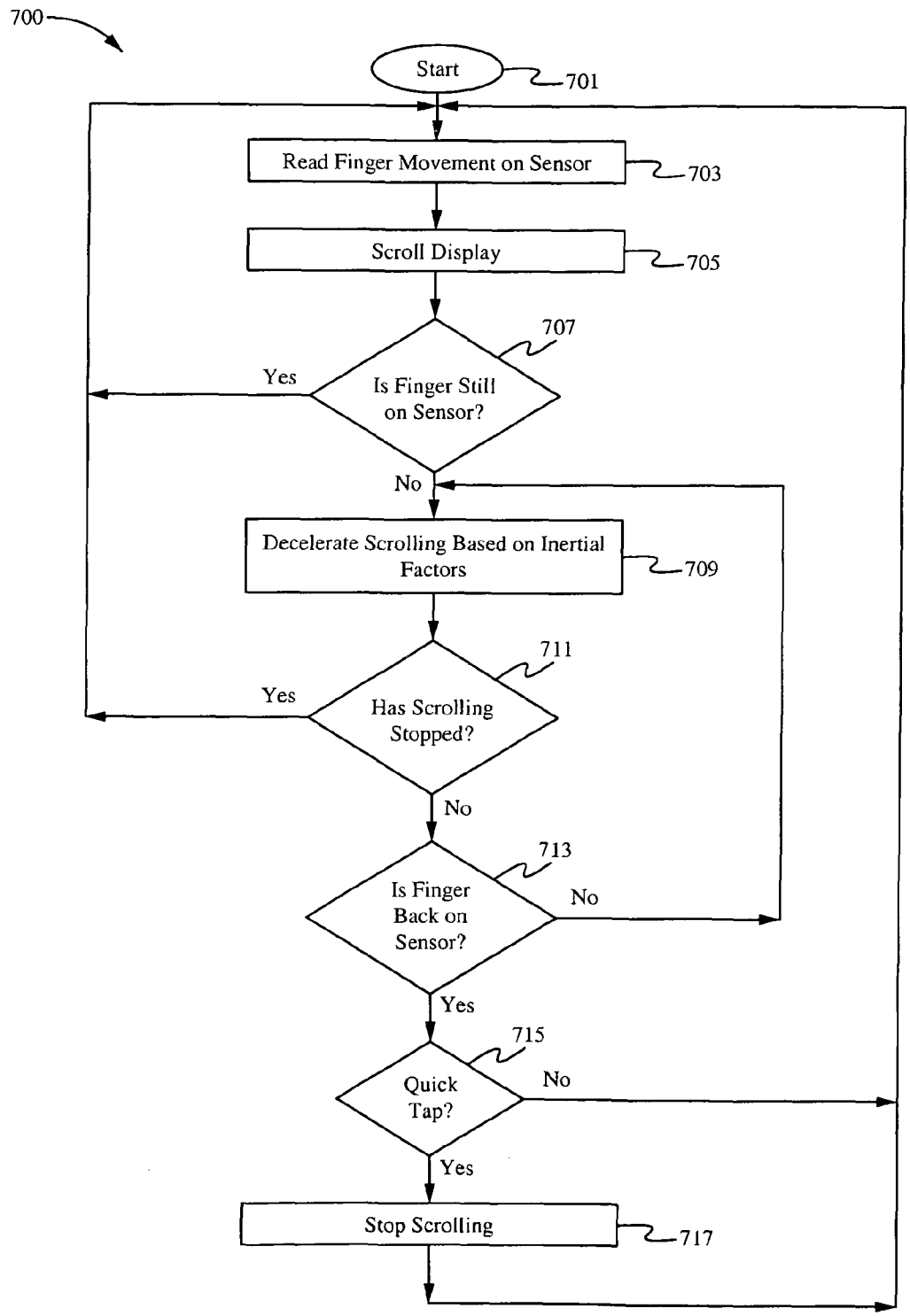
FIG. 8 is a flow chart showing the steps for scrolling through a screen display using a sudden-stop feature in accordance with one embodiment of the present invention.

FIG. 8 shows the steps of a process 700 incorporating the sudden-stop feature when scrolling through the menu 120 in FIGS. 1A-E. Referring to FIGS. 1A-E and 8, in the start step 701, parameters, such as a dampening factor, are initialized. In the step 703, the process reads the movement of the finger 101 along a surface of the sensor 105. In the step 705, the menu 120 is scrolled in a manner corresponding to the finger movement. Next, in the step 707, the process determines whether the finger 101 is still contacting the sensor 105. If the finger 101 is still contacting the sensor 105, the process loops back to the step 703; otherwise, the process continues to the step 709.

In the step 709, the process decelerates the scrolling based on the inertial factors, such as described above. In the step 711, the process determines whether the scrolling has stopped. If the scrolling has stopped, the process loops back to the step 703; otherwise, the process continues to the step 713, in which it determines whether the finger 101 is again contacting the sensor 105. If the finger 101 is not again contacting the sensor 105, the process loops back to the step 703; otherwise, the process continues to the step 715.

In the step 715, the process determines whether the sensor 105 was tapped quickly, thereby triggering a sudden stop. As one example, the process determines that the sensor 105 was tapped quickly if the finger 101 next contacts the sensor 105 at a time $T_A$ and is removed at a time $T_B$, where $T_B-T_A \le 5$ ms. Those skilled in the art will recognize other ways of defining and later recognizing a tap as "quick." If, in the step 715, the process determines that the tap is quick, the process continues to the step 717, in which the scrolling is suddenly stopped; otherwise, the process loops back to the step 703.

While FIG. 8 describes scrolling based on inertial factors, it will be appreciated that the sudden-stop feature is able to be used to decelerate scrolling and other motions using other kinds of deceleration, including non-uniform ones. Those skilled in the art will recognize other ways of triggering a sudden stop in accordance with the present invention. In an alternative embodiment, the sudden-stop feature is triggered by contacting the sensor 105 and maintaining the contact for a predetermined time, such as one or two seconds.

Embodiments of the present invention are also able to accelerate or decelerate motion of a computer display. As one example, consecutive finger swipes in a same direction result in accelerating the motion. Swiping in one direction followed by a swipe in the opposite direction results in decelerating the motion. FIGS. 9A-H illustrate how the motion of the display 120 (FIGS. 1A-E) is accelerated by swiping the finger 101 multiple times along the finger sensor 105 over a sequence of increasing times $T_0$-$T_7$, respectively.

Each of the FIGS. 9A-H depicts a graph 150 plotting a speed of the display 120 (on the vertical axis labeled "v1" to "v7") versus time. Each occurrence of the graph 150 identifies the current speed by the label 155. FIGS. 9D-H also label the speed at the immediately preceding time with an "x," tracing changes in velocity with dotted lines. As shown in FIGS. 9A-H, swiping the finger sensor 105 multiple times increases the speed of the display 120. Increasing speed in this way is referred to as "additive" motion.

Figure 9A:
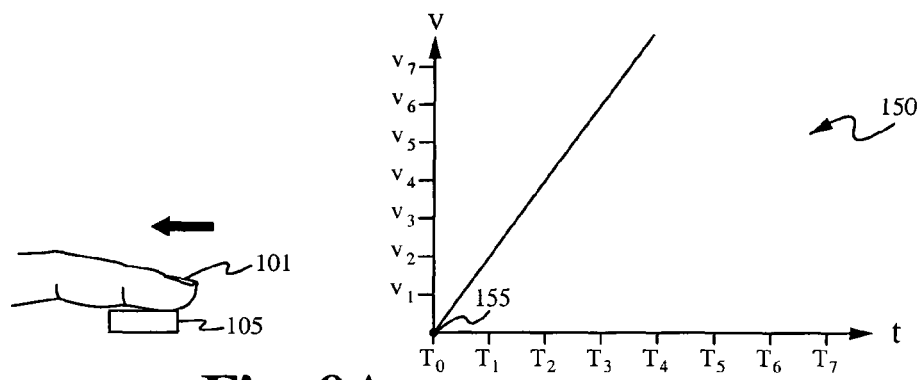
FIGS. 9A-H each shows finger movement along a finger sensor and a corresponding graph of display speed versus time in accordance with one embodiment of the present invention.
Figure 9B:
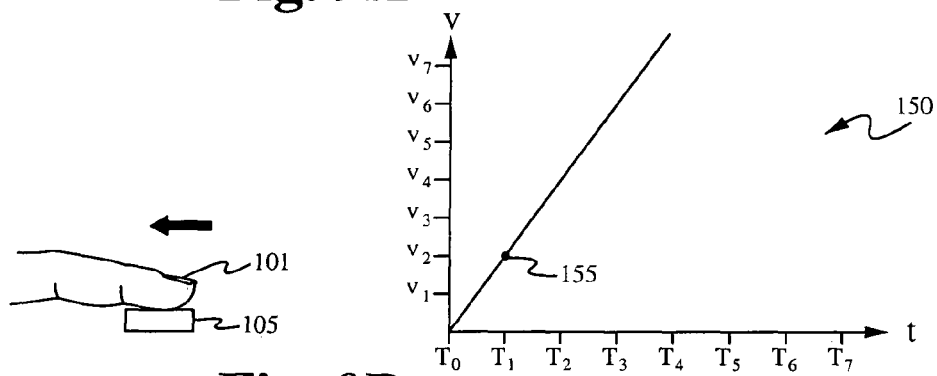
Figure 9C:
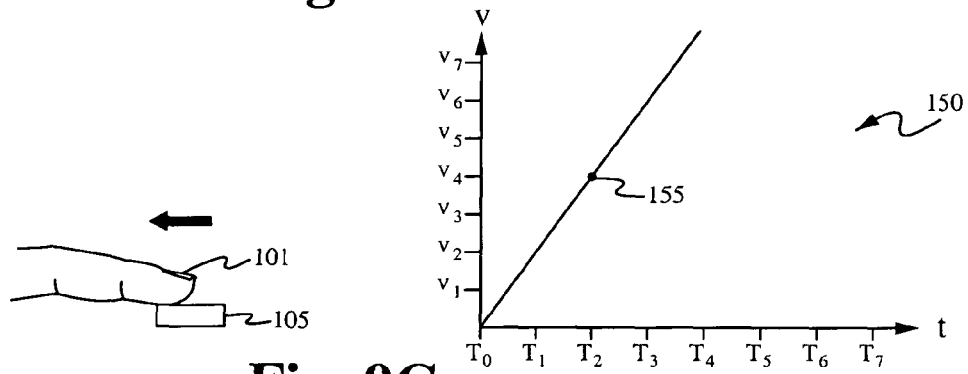
Figure 9D:
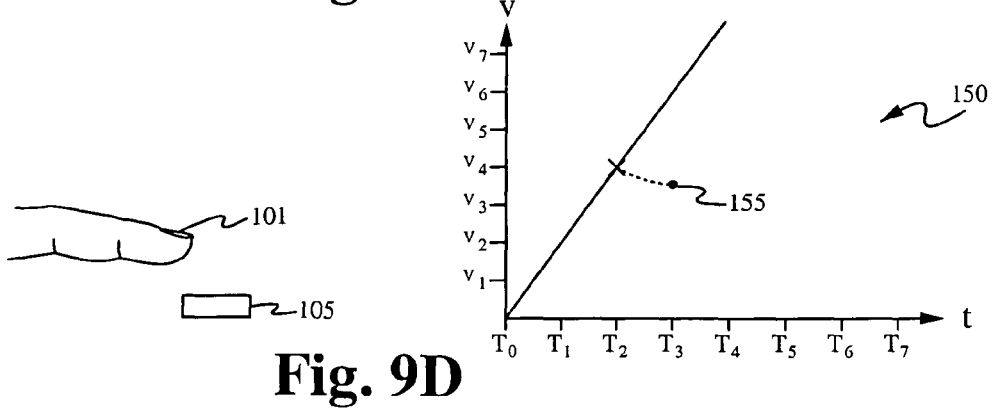
Figure 9E:
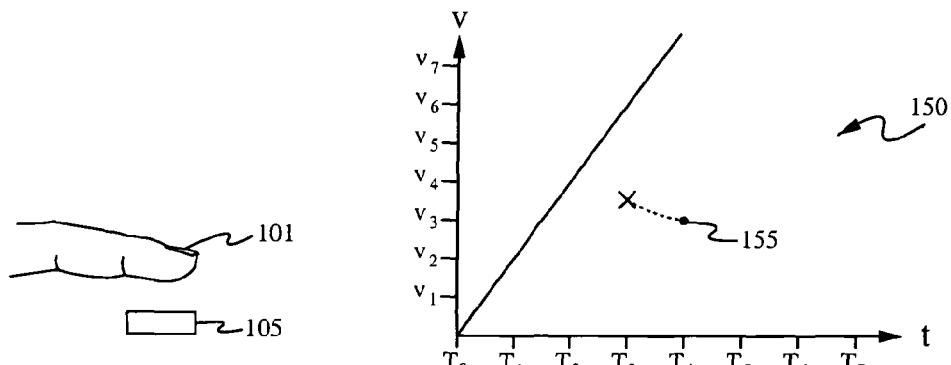

As shown in FIGS. 9A-C, moving the finger 101 across the finger sensor 105 from time $T_0$ to $T_2$ causes the speed of the display 120 to increase from 0 to v4. After the finger 101 is removed from the sensor 105 immediately after the time $T_2$ (FIGS. 9C-D), from then until the time $T_5$ (FIGS. 9C to 9F), the speed decreases.

Figure 9F:
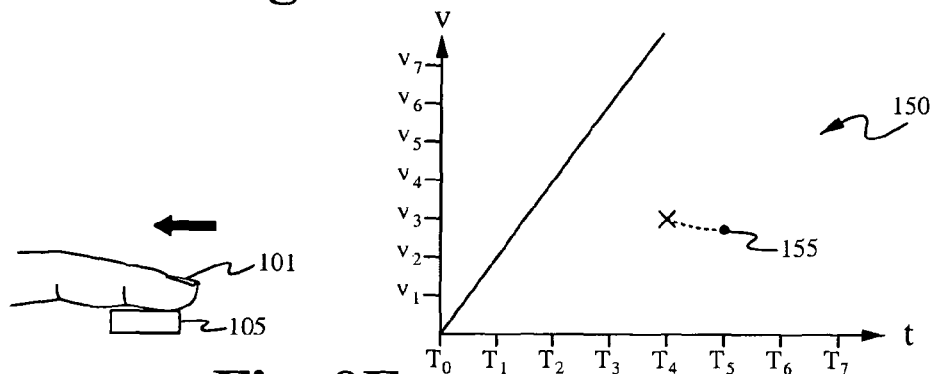
Figure 9G:
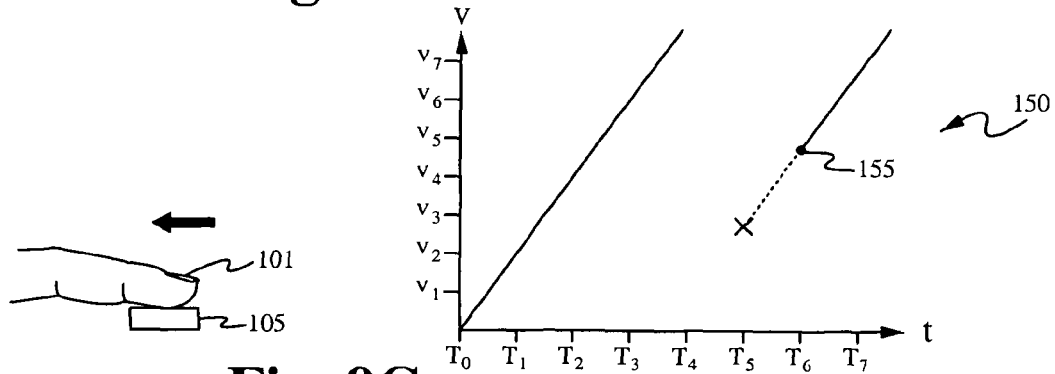
Figure 9H:
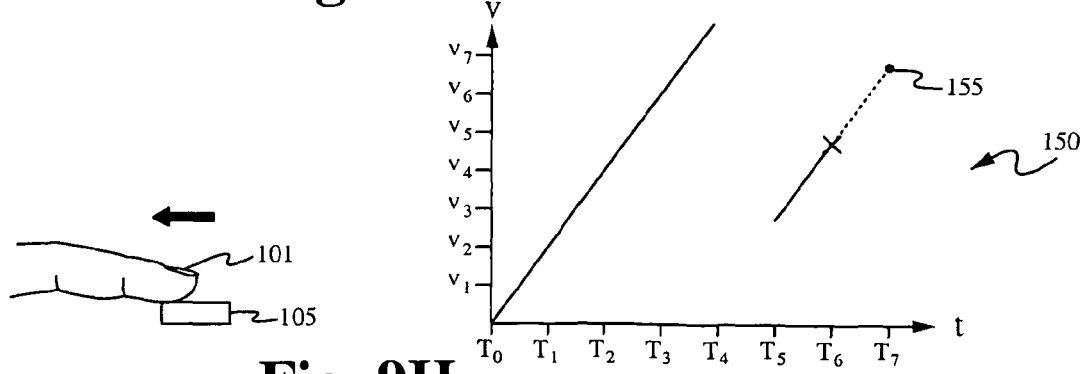

After the finger 101 is returned to the sensor 105 at the time $T_6$ (FIG. 9G), the finger 101 is swiped a second time (time $T_5$ to $T_7$, FIGS. 9F-H). Because this second swipe begins when the display 120 is already in motion, the swipe results in a greater speed than the initial swipe (from time $T_0$ to $T_2$).

Preferably, the speed of the display 120 increases with the number of swipes and also with the total distance traveled by the swipes. Thus, swiping the finger 101 along the finger sensor 105 five times will move the display 120 faster than if the finger 120 was swiped four times. And swiping the finger 101 five times a total distance of five inches will result in a faster motion than swiping the finger 101 five times but a total distance of four inches.

While FIGS. 9A-C and 9G-H show a constant acceleration (e.g., the graph 150 during the corresponding time periods has a constant slope), other types of acceleration are able to be attained in accordance with the present invention. Some examples include exponential acceleration, with or without a maximum value; and step-wise acceleration, to name only two types. Furthermore, acceleration can be determined using a look-up table, such as one having scaling factors with values larger than one. Using the table entries of one such example, the speed is multiplied by the scaling factors 1.1, 1.5, and 2.0 in sequential time intervals.

In this example, the speed decreases from $T_2$ to $T_5$ with an inertial decay, in accordance with one embodiment of the present invention. It will be appreciated that in accordance with other embodiments, the speed can decrease from $T_2$ to $T_5$ in other ways, both uniform and non-uniform.

In still another embodiment, motion is accelerated by swiping and holding a finger or other object on a finger sensor. An initial swipe will start accelerating a display (e.g., display 120 in FIGS. 1A-E). At the end of the swipe, the finger is held stationary, or nearly stationary. The display will continue to accelerate while the finger is held in place. The longer the finger is held in place, the faster the display moves, until a maximum speed (peak threshold) is reached. After the display reaches the desired speed, the finger is either removed or moved farther to complete the swipe.

It will be appreciated that embodiments of the present invention can be combined in many ways. For example, the sudden stop feature can be implemented to suddenly stop the additive motion. Similarly, the sudden stop feature, the additive motion, and the deceleration, all in accordance with the present invention, can all be combined in any combination.

Figure 10:
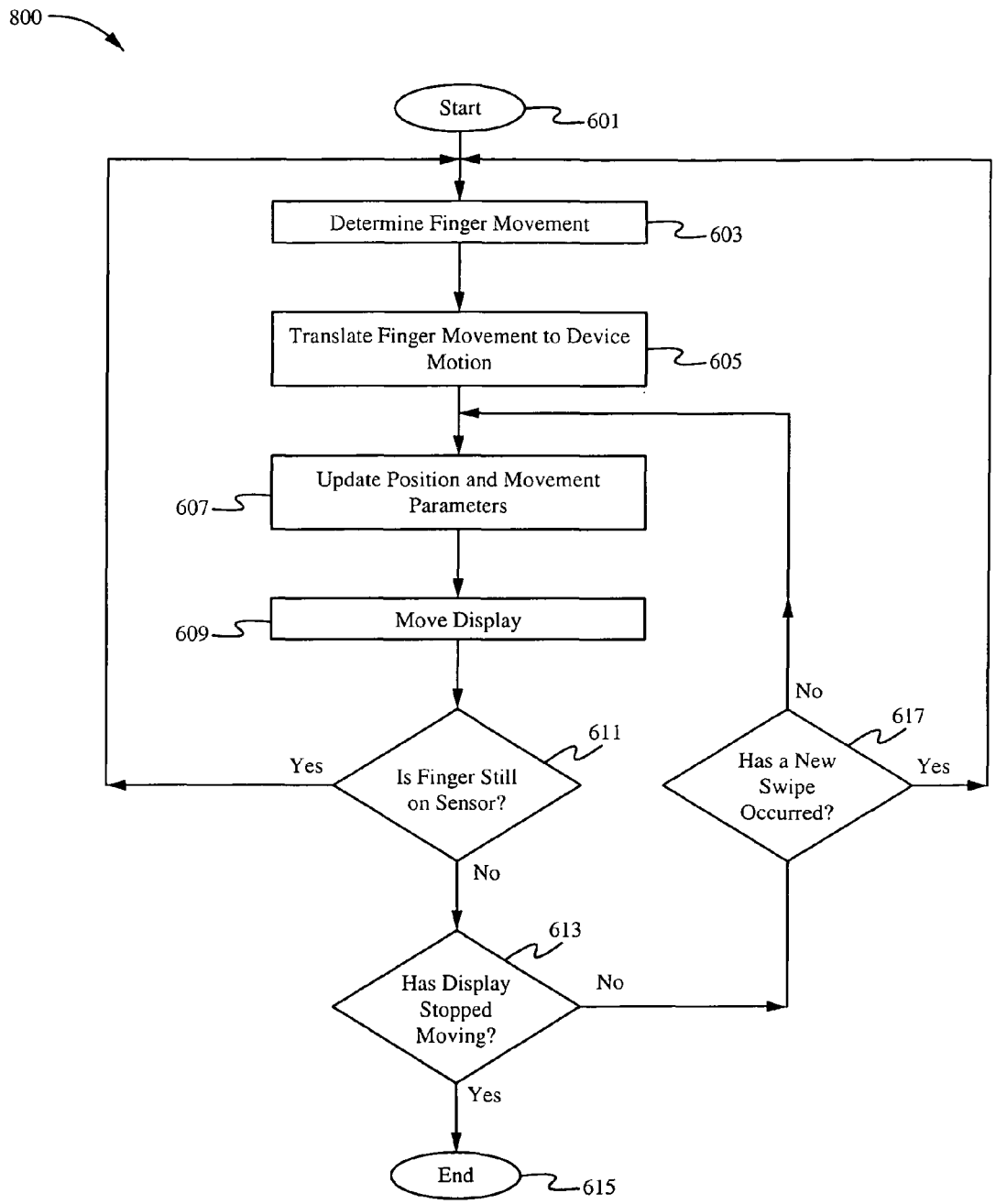
FIG. 10 is a flow chart of the steps for determining additive motion in accordance with one embodiment of the present invention.

FIG. 10 shows the steps of a process 800 for determining additive motion, such as additive scrolling, in accordance with one embodiment of the present invention. Many of the steps in the process 800 are similar to the steps in the process 600, shown in FIG. 7, and are similarly labeled. To simplify the discussion, the common steps will not be discussed here. Referring to FIG. 10, from the step 613, the process determines whether the display has stopped moving. If it has not, the process continues to the step 617, in which it determines whether a new (e.g., consecutive or sequential) swipe has occurred. If a new swipe has not occurred, the process loops back to the step 607. Otherwise, the process loops back to the step 603. If, in the step 603, the process determines that the finger was swiped in the same direction as during the immediately preceding swipe, the process later updates the position and movement parameters in the step 607 to accelerate the display motion. On the other hand, if, in the step 603, the process determines that the finger was swiped in a direction opposite to that of the immediately preceding swipe, the process later updates the position and movement parameters in the step 607 to decelerate the display motion.

Figure 11:
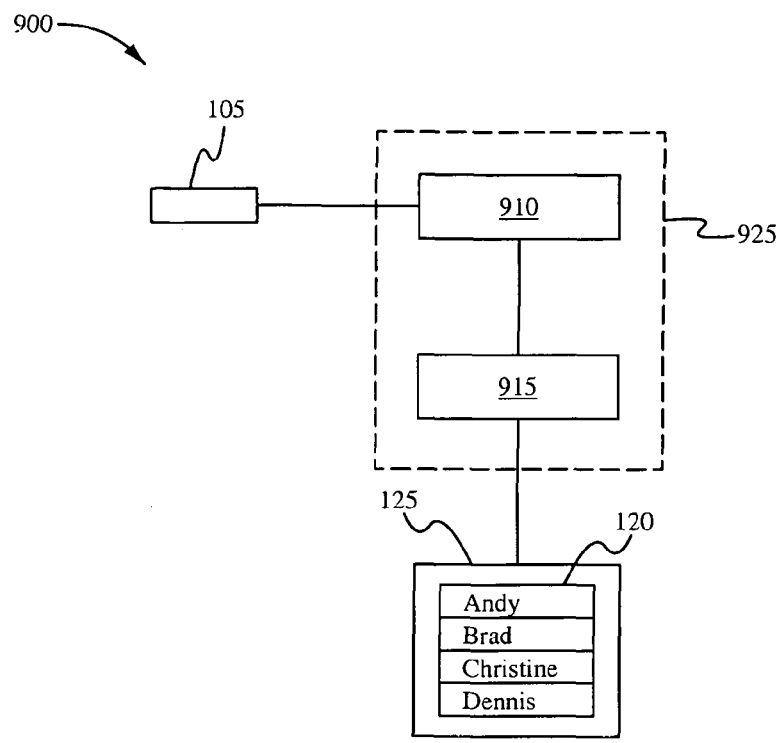
FIG. 11 is block diagram of the components of a system for scrolling through a display by emulating a scroll wheel in accordance with one embodiment of the present invention.

FIG. 11 is a block diagram of a system 900 used to emulate a scroll wheel using decay in accordance with the present invention. The system 900 includes the finger sensor 105 coupled to a translation module 925, which translates finger movements into scroll wheel signals for scrolling the menu 120 on the display 125, as shown in FIGS. 1A-E. The translation module 925 includes a movement correlator 910 and a motion translator 915. The movement correlator 910 correlates images sequentially captured by the finger sensor 105 and determines finger movement, such as in the step 303 of FIG. 4. The motion translator 915 receives the finger movement, translates the finger movement into joystick movement (step 305, FIG. 4), calculates new joystick movement (step 307, FIG. 4), updates inertial/acceleration factors based on joystick position (step 309, FIG. 4), translates the joystick position into a scrolling motion by applying the acceleration factors (step 311, FIG. 4), and scrolls the menu accordingly (step 313, FIG. 4).

In one embodiment, both of the elements 910 and 915 include a computer-readable medium containing instructions that cause a processor to perform the steps of FIG. 4. In other embodiments, the elements include software, hardware, firmware, or any combination of these.

Figure 12:
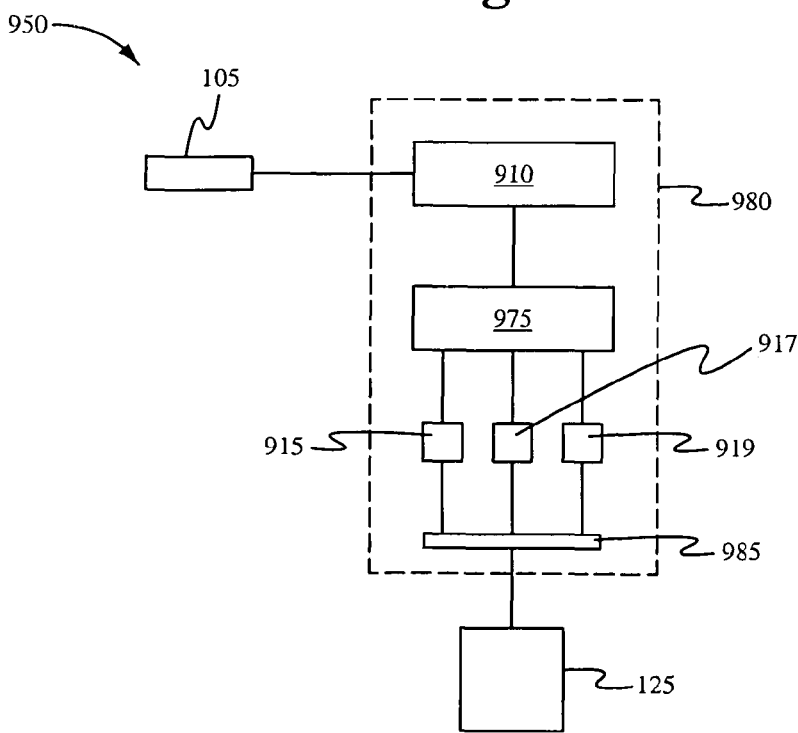
FIG. 12 is block diagram of the components of a system for navigating through displays by emulating a scroll wheel, a mouse, and a wheel in accordance with one embodiment of the present invention.

It will be appreciated that the steps shown in FIG. 4 can be distributed among the components 910 and 915 in different ways, or among other components, such as described in FIG. 12, below. Preferably, the components 910 and 915 are also configured to implement the sudden-stop feature described in FIG. 8, the additive motion feature described in FIG. 10, or both.

In one embodiment, a motion translator is used to provide inertial deceleration when emulating multiple different input devices. For example, inertial deceleration is used to gradually decelerate movement corresponding to a scroll wheel, a wheel (e.g., a roulette wheel), and a mouse. Preferably, a single acceleration/deceleration module (such as one simulating deceleration, acceleration, and a sudden-stop feature) is shared among several device emulators. FIG. 12 illustrates a system 950 that emulates several electronic input devices, all of which use acceleration/deceleration in accordance with the present invention.

The system 950 includes the elements 105 and 125, described above. The system 950 also includes a translation module 980, which includes the movement correlator 910 and an acceleration/deceleration calculator 975. The acceleration/deceleration calculator 975 is coupled to a scroll wheel emulator 915, a wheel emulator 917, and a mouse emulator 919, all of which are coupled to a switch 985, which in turn is coupled to the display device 125. The switch 985 routes to the display device 125 the emulator (i.e., 915, 917, and 919) corresponding to the device currently being emulated. Device emulation using fingerprint sensors is discussed in U.S. Pat. No. 7,474,772, filed Jun. 21, 2004, and titled "System and Method for a Miniature User Input Device," which is incorporated by reference in its entirety.

In one example, referring to FIGS. 7 and 10, the acceleration/deceleration calculator 975 performs the step 607, determining the inertial decay from position and movement parameters. When the finger sensor 105 is used to emulate a scroll wheel, the step 605 is performed by the scroll wheel emulator 915. When the finger sensor 105 is used to emulate a wheel, device movement is determined by the wheel emulator 917. When the finger sensor 105 is used to emulate a mouse, device movement is determined by the mouse emulator 919. Again, the elements 915, 917, and 919 can all be implemented using any combination of hardware, software, firmware, or computer-readable media for controlling the operation of a processor.

Embodiments of the invention are also able to control a display in response to pressing a surface of a finger sensor, such as by a finger tap. As such, their usefulness can be seen in all variants of fingerprint sensor navigation. As one example, movement having an inertial decay in accordance with the present invention is used to move through a list of items, to zoom in on or zoom out from an image of a city map, to select a large grid menu, and to control an arcade game, such as billiards, that provides virtual realism in terms of movement.

As one example, referring to FIGS. 1A-E, after the scrolling gradually comes to a stop, the user presses the surface of the finger sensor 105 to select a highlighted name, such as the topmost name in the menu display 120. Contact information for the highlighted name is then immediately presented on the display device 125.

As another example, referring to FIGS. 1A-E and 5, after the window 410 has come to a stop (position 425E), tapping the finger sensor 105 in a predetermined manner (e.g., one quick tap) zooms in on that portion of the image within the window 410; tapping the finger sensor 105 in another predetermined manner (e.g., two quick taps in succession or a tap-and-hold motion) zooms out from the same portion of the image. Those skilled in the art will recognize other actions that can be taken by tapping or otherwise increasing a pressure on a surface of the finger sensor 105.

One embodiment of the invention allows for dual-mode scrolling. In this mode, a system is configured to perform both single-step (non-inertial) scrolling and inertial scrolling through the adjustment of the dampening factor based upon the context of recent movement. If the recent movement is indicative of slow or single-step scrolling, then the dampening factor is decreased substantially, resulting in what is effectively non-inertial scrolling (e.g., the joystick reverts to the zero or home position nearly instantly). As one example, the system determines that recent movement indicates a preference for slow or single-step scrolling when a user implements the sudden-stop feature several consecutive times. In response, the system adjusts the damping factor (e.g., in the step 309) to ensure that the return-to-home motion is fast, approaching a single-step mode.

In the operation of one embodiment of the invention, a user swipes or traces a finger on a finger sensor to set a display in motion. During the swipe, the system determines the direction of the swipe and other parameters, such as the duration of the swipe or the acceleration of the swipe. During the swipe, the user can accelerate the motion by again swiping in the same direction as before; or she can decelerate the motion by swiping in a different direction. Once the swipe is completed, the display continues in the same direction, before slowing down. This motion provides the user with a more pleasurable viewing experience as the display rolls to a smooth stop. The user also has greater control over moving the display. Later, the user can tap the finger sensor to trigger an action, such as selecting a highlighted object.

In a preferred embodiment, a finger sensor, computing elements, and display device are integrated onto a single device, such as a mobile phone, personal digital assistant, or portable gaming device. Alternatively, a system in accordance with the present invention includes separate components, such as a swipe sensor, display screen, and host computer.

Those skilled in the art will recognize that modifications can be made to embodiments of the invention. For example, while most of the embodiments disclose a finger swipe sensor, other embodiments use a finger placement sensor. Furthermore, in the flow charts given, some steps can be skipped, others added, and all can be performed in different sequences. It will be readily apparent to one skilled in the art that other modifications may be made to the embodiments without departing from the spirit and scope of the invention as defined by the appended claims.

We claim:

1. A method comprising:
generating motion of elements on a computer display in response to swiping an object along a contact surface of a finger sensor to emulate an electronic input device;
determining a swiping speed and length by sequentially capturing swiping object surface patterns by the finger sensor;
calculating an angle from a vertical axis that is perpendicular to a horizontal plane of the emulated electronic input device, the angle corresponding to a position of the emulated electronic input device using the swiping speed and length; and
gradually decelerating the motion with an inertial decay calculated using the calculated angle corresponding to the position of the emulated electronic input device after the swiping is completed and the object is removed from contact with the contact surface of the finger sensor.

2. The method of claim 1, wherein the inertial decay is calculated using a model of a joystick return-to-home motion.

3. The method of claim 1, further comprising stopping the motion in response to tapping the finger sensor after the swiping is completed.

4. The method of claim 1, further comprising performing an action on a computer system in response to changing a pressure on the finger sensor after the swiping is completed.

5. The method of claim 4, wherein the computer display shows an image and the action comprises one of zooming in on the image and zooming out from the image.

6. The method of claim 1, wherein the motion corresponds to one of scrolling through a list of items, rotating an image, and moving over an image.

7. The method of claim 1, wherein the computer display shows one of a list of items, a region of an image, a grid menu, slides of images, a game image, and an element of a computer simulation.

8. The method of claim 1, further comprising changing a speed of the computer display in response to multiple swipes of the object.

9. The method of claim 8, wherein changing the speed comprises increasing the speed if subsequent swipes are in a same direction as the swiping.

10. The method of claim 8, wherein changing the speed comprises decreasing the speed if subsequent swipes are in a different direction as the swiping.

11. The method of claim 1, further comprising accelerating the motion by holding the object stationary on the finger sensor before the swiping is completed.

12. The method of claim 1, wherein the finger sensor is a finger swipe sensor.

13. The method of claim 1, wherein the finger sensor is a finger placement sensor.

14. A navigation system comprising:
a finger sensor having a contact surface and configured to determine a swiping speed and length of swiping along the contact surface by sequentially capturing swiping object surface patterns; and
a translator module configured to calculate an angle from a vertical axis that is perpendicular to a horizontal plane of an emulated electronic input device, the angle corresponding to a position of the emulated electronic input device using the swiping speed and length and to gradually decelerate a motion of elements on a computer display with an inertial decay calculated using the calculated angle corresponding to the position of the emulated electronic input device in response to completing swiping of the object across the finger sensor and removing the object from contact with the contact surface of the finger sensor.

15. The navigation system of claim 14, wherein the decelerating is uniform.

16. The navigation system of claim 14, wherein the inertial decay is modeled on a joystick return-to-home motion.

17. The navigation system of claim 14, further comprising accelerating the motion in response to receiving one or more swipes across the finger sensor in a same direction as the swiping.

18. The navigation system of claim 14, wherein decelerating comprises decelerating the motion in response to receiving one or more swipes across the finger sensor in an opposite direction as the swiping.

19. The navigation system of claim 14, wherein the translator module is also configured to single-step scroll through the computer display.

20. The navigation system of claim 14, wherein the translator module is also configured to control the computer display in response to determining a change in pressure on a surface of the finger sensor.

21. The navigation system of claim 14, wherein the translator module is also configured to suddenly stop the motion in response to a stop motion across the finger sensor.

22. The navigation system of claim 21, wherein the stop motion is a tap or a press-and-hold motion.

23. The navigation system of claim 14, wherein the translator module comprises a non-transitory computer-readable medium containing computer instructions that, when executed by a processor, result in gradually changing the motion.

24. A navigation system comprising:
a finger sensor having a contact surface;
a movement correlator coupled to the finger sensor configured to determine a swiping speed and length of swiping along the contact surface by sequentially capturing swiping object surface patterns by the finger sensor;
an acceleration calculator coupled to the movement correlator, wherein the acceleration calculator is configured to calculate an angle from a vertical axis that is perpendicular to a horizontal plane of an emulated electronic input device, the angle corresponding to a position of the emulated electronic input device using the swiping speed and length, and gradually at least one of accelerate and decelerate a motion of elements on a computer display device based upon the calculated angle corresponding to the position of the emulated electronic input device in response to completing a swipe of the object across the finger sensor and removing the object from contact with the contact surface of the finger sensor; and
a plurality of electronic input device emulators, each coupled to the acceleration calculator and to the computer display device.

25. The navigation system of claim 24, wherein the acceleration calculator is configured to determine an inertial decay of the deceleration.

26. The navigation system of claim 24, wherein the emulated electronic input device comprises at least one of a joystick emulator, a mouse emulator, a scroll wheel emulator, a push-button emulator, and a wheel emulator.

27. The method of claim 1, wherein the swiping object is a finger.

28. The navigation system of claim 14, wherein the swiping object is a finger.

29. The navigation system of claim 24, wherein the swiping object is a finger.

30. The method of claim 1, wherein the angle of the emulated electronic input device is calculated in accordance with a first equation $$\theta_t = \theta_1 e^{-(\Omega+K)t}$$

where $\theta_t$ is the angle of the emulated electronic input device at time t when gradually decelerating the motion of elements, $\theta_1$ is the calculated angle of the emulated electronic device when the swiping is completed, K is a constant, and $\Omega$ is a damping factor.

31. The method of claim 1, wherein a linear speed of the elements gradually decelerating is calculated in accordance with a second equation $$dx/dt = L * d\theta/dt * \cos(\theta)$$

where L is a length of the emulated electronic input device, and x is distance from a point of reference at time t when gradually decelerating the motion of the elements.

* * * * *